March 31, 1942.  W. M. EMERY  2,278,067
SEWER CLEANER
Filed May 31, 1940
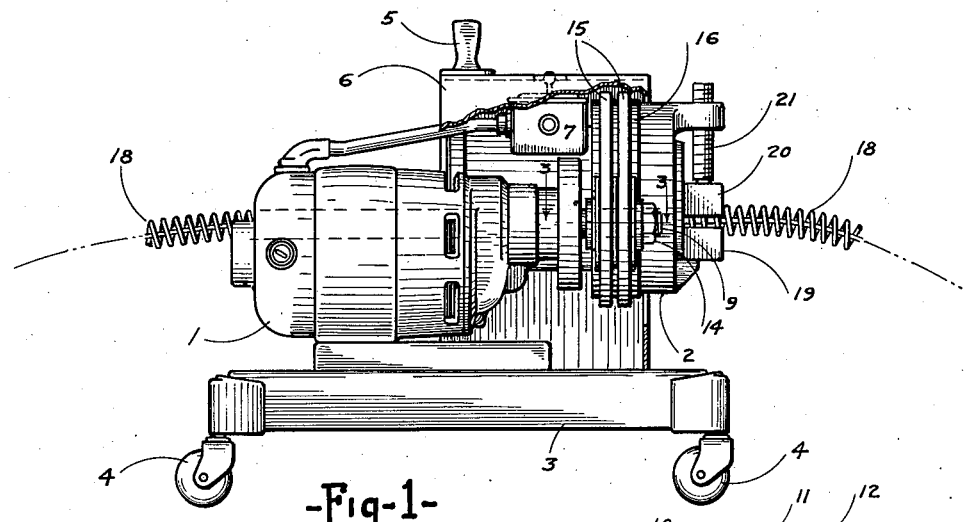
-Fig-1-
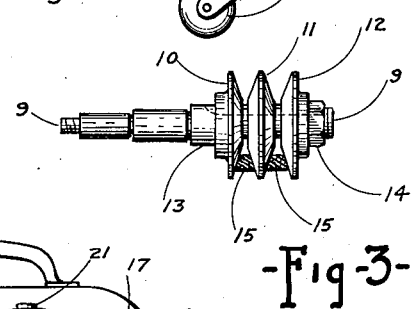
-Fig-3-
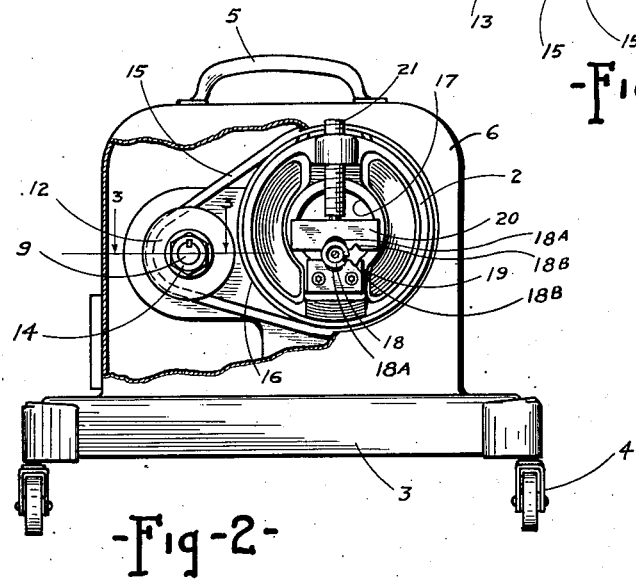
-Fig-2-
INVENTOR.
WILLIAM M. EMERY
BY Robert W. Wilson
ATTORNEY.

Patented Mar. 31, 1942

2,278,067

UNITED STATES PATENT OFFICE 2,278,067

SEWER CLEANER

William M. Emery, Cleveland Heights, Ohio, assignor to The Oster Manufacturing Company, Cleveland, Ohio, a corporation of Ohio Application May 31, 1940, Serial No. 338,145

1 Claim. (Cl. 15—104.30)

This invention pertains to a sewer pipe cleaner of the type wherein a motor and chuck on a movable mounting drive a long flexible shaft, generally called a "snake," which carries some sort of a clearing tool at its front end. The purposes of the invention include improvement of the drive and imparting a more effective motion to the snake.

The object of the invention, to give the snake a more effective motion than a simple rotation, is preferably accomplished by so connecting the snake to the drive unit that the snake has a flopping or wriggling movement in addition to its rotation, and thus tends to keep material which has been dislodged by the working tool stirred up and well loosened behind the tool.

The couplings are capable of being passed through the rotatable driving chuck or spindle with the snake, so that additional snake sections may, if more convenient, be added from behind instead of from in front of the drive unit.

A preferred form of the invention is disclosed in the accompanying drawing and the following detailed description.

In the drawing

Fig. 1 is a side elevation and Fig. 2 a front elevation of the drive and mounting of the cleaner, with a portion of a snake therein; parts of the drive casing being broken away to show the power take-off;

Fig. 3 is a side view of the drive pulley, detailed, taken from a location in the assembly which is generally indicated by arrows 3—3 in Figs. 1 and 2.

The power unit comprises a gear motor 1 and chuck 2 driven thereby, all mounted on a platform or dolly 3 which rolls on casters 4, and has a lifting handle 5 at the balance point of the drive housing 6. The motor is preferably series wound universal, high speed, with variable speed and torque, and is controlled by a conveniently located reversing snap switch 7. It drives shaft 9 through suitable reduction gearing in the gear motor housing. Three pulley members 10, 11 and 12, forming two variable V-channels, are keyed to shaft 9. The rear pulley member 10 is backed against a shoulder 13 on shaft 9, while 11 and 12 are longitudinally movable on the key. The forward travel of 12 is limited by a nut 14 which can be set where desired along shaft 9, although locking means are omitted to simplify the drawing. Two flat-bottomed V-belts 15 are driven by the pulleys and in turn drive a larger flat pulley 16 on the forward end of a spindle 17 through which the snake 18 passes and to the forward end of which the snake is clamped by a chuck having a lower jaw 19 fixed to one side of the spindle and an upper jaw 20 with opposed arcuate notches 18A in each, the upper jaw being opened and closed by a pressure screw 21. The chuck is thus eccentric to the rotation of the spindle, and thereby gives the snake a flopping movement in addition to its rotation. Smaller opposed V notches 18B, offset to one side, are alternatively used to hold a special snake of angular cross section, such as are known in the art.

The action of the drive is that the tension on belts 15 can be closely and accurately adjusted by setting up or backing off the nut 14, thus determining the overload at which slippage will occur before the force applied to the snake causes the latter to break or kink. The distance between centers of shaft 9 and spindle 17 is fixed and permanent, thus avoiding the mechanical complications and disadvantages of relatively movable shaft centers without losing the capability of controlling the belt slippage point. Any slight difference in the effective length of the two belts 15 is compensated by floating of the middle pulley member 11 along the shaft 9.

Operation

A snake with the appropriate tool on the front end is put through the spindle 17, clamped therein by the chuck and started into the pipe to be cleaned. The motor is turned on and the dolly 3 pushed forward, thereby advancing the snake, or the snake pulls the dolly forward if the tool is self-advancing, such as an auger. When the dolly is near the opening the motor is stopped, the chuck loosened, the dolly pulled back and the chuck clamped at whatever distance is selected for the next advance. When the entire length of the snake (usually 50 feet) is so used up, another length is coupled on and the process continued. If the coupling is small enough to pass through the spindle 17, the additional length of snake may be added either behind or in front of the drive unit.

Where a cutting tool is advancing in the pipe without serious resistance it will be turning rapidly and thus attacks any difficult obstruction to good advantage. As the resistance becomes greater the torque of the series motor is increased, so that the tool still works advantageously. Where a coiled snake is used the snake itself stores power, and its action is cumulative to that of the motor. As the resistance increases the continuing drive closes the snake coils, and since the motor is gradually slowing down, this coil closing is gradual, and the operator can judge its extent, and the resistance the cutter is meeting, by the feel of the snake. The belts will slip before the snake breaks. If the going becomes too difficult the operator will withdraw the tool from the obstruction a short distance by pulling the snake back a little, whereupon the snake will give up its stored energy, whirling the tool rapidly, and the motor will also automatically speed up; the operator then quickly feeds the snake forward again to get a fast cut in the obstructing material. This operation may be repeated as often as necessary. Since the action of the motor is automatic both hands of the operator are free to manipulate the snake.

It will be understood that the foregoing description, with illustrative drawing, covers the preferred form of my invention, by way of example rather than limitation, and that the scope of the invention is to be ascertained by the claim.

I claim:

In a sewer cleaning apparatus, in combination, driving means, a driven spindle, a chuck in said spindle and off the center of rotation thereof, a snake adapted to pass through said spindle and to be held by said chuck, said off center chuck being adapted to give said snake a bodily flopping spiral motion in addition to its rotation.

WILLIAM M. EMERY.